United States Patent
Saito et al.

(10) Patent No.: US 8,854,021 B2
(45) Date of Patent: Oct. 7, 2014

(54) DC-DC CONVERTER AND DC-DC CONVERSION METHOD

(75) Inventors: Hiroshi Saito, Tokyo (JP); Yuichi Goto, Hiratsuka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 283 days.

(21) Appl. No.: 13/424,526

(22) Filed: Mar. 20, 2012

(65) Prior Publication Data

US 2013/0076321 A1 Mar. 28, 2013

(30) Foreign Application Priority Data

Sep. 26, 2011 (JP) .................. 2011-209702

(51) Int. Cl.
*H02M 1/084* (2006.01)
*H02M 3/158* (2006.01)
*H02M 1/00* (2006.01)

(52) U.S. Cl.
CPC .......... *H02M 3/1588* (2013.01); *Y02B 70/1466* (2013.01); *H02M 3/1584* (2013.01); *H02M 2001/0003* (2013.01)
USPC ........................................................ 323/272

(58) Field of Classification Search
CPC .......... H02M 1/084; H02M 2003/158; H02M 2003/1584; H02M 2003/1586; H02M 3/1584
USPC ........................................................ 323/272
See application file for complete search history.

(56) References Cited

U.S. PATENT DOCUMENTS 6,839,252 B2 * 1/2005 Tai et al. .................. 363/65

FOREIGN PATENT DOCUMENTS

JP 2009-213239 A 9/2009

OTHER PUBLICATIONS

Background Art Information Sheet provided by Applicants, Dec. 15, 2011 (1 page total).

* cited by examiner

*Primary Examiner* — Harry Behm
(74) *Attorney, Agent, or Firm* — Posz Law Group, PLC

(57) ABSTRACT

A DC-DC converter has a plurality of DC-DC converting units, a plurality of inductor elements, a plurality of duty detection circuits, and a duty adjustment circuit configured to compare output signals from two detection circuits as each group, and to adjust the duty ratio of the DC-DC converting unit connected to one of the two duty detection circuits based on a result of comparing the output signals so that the duty ratio of the square wave voltage of each group becomes equal.

18 Claims, 14 Drawing Sheets

DC-DC CONVERTER AND DC-DC CONVERSION METHOD

CROSS REFERENCE TO RELATED APPLICATIONS

This application is based upon and claims the benefit of priority from the prior Japanese Patent Application No. 2011-209702, filed on Sep. 26, 2011, the entire contents of which are incorporated herein by reference.

FIELD

Embodiments of the present invention relate to a DC-DC converter for performing DC-DC conversion using a plurality of DC-DC converting units.

BACKGROUND

Recent electronic components are generally driven by low voltage to reduce power consumption. A DC-DC converter is used to generate power-supply voltage for such an electronic circuit.

In the DC-DC converter, the amount of current which can flow through a load is determined in advance. When the current exceeding the predetermined level passes through the load, power-supply voltage level is lowered and desired electrical characteristics cannot be obtained.

In the development stage of an electronic circuit, it is difficult to correctly estimate the total capacity of loads. Normally, a certain level of margin is set for load capacity and a DC-DC converter corresponding thereto is employed. However, there is a case where load capacity slightly exceeds the level previously estimated, in the final development stage of the electronic circuit. In such a case, it is generally difficult to secure sufficient time for replacing the DC-DC converter by a high-current type. Accordingly, as a countermeasure for this problem, the number of DC-DC converters to be employed is increased by one or more to increase current capacity.

When a plurality of DC-DC converters are connected in parallel to a power-supply line, it is ideal that each DC-DC converter operates evenly. However, in actual cases, some DC-DC converters may operate unevenly due to the variation in electronic components in the DC-DC converter. Accordingly, current supply to a large capacity load cannot be shared by a plurality of DC-DC converters, which leads to a problem that the power-supply voltage of the electronic circuit on the load side is reduced.

DETAILED DESCRIPTION

According to one aspect of one embodiment, a DC-DC converter has a plurality of DC-DC converting units outputting a square wave voltage, a plurality of inductor elements, each inductor element being connected to each of the DC-DC converting units, and comprising one end connected to an output terminal of its corresponding DC-DC converting unit and another end connected to a common external output terminal, a plurality of duty detection circuits, each duty detection circuit being connected to the output terminals of each of the DC-DC converting units, and to detect a duty ratio of the square wave voltage outputted from its corresponding DC-DC converting unit, and a duty adjustment circuit comparing output signals from the duty detection circuits, and to adjust the duty ratio of the DC-DC converting unit connected to one of the duty detection circuits based on a result of comparing the output signals so that the duty ratio of the square wave voltage of each of the DC-DC converting units becomes equal.

Embodiments of the present invention will now be explained with reference to the accompanying drawings.

First Embodiment

Figure 1:
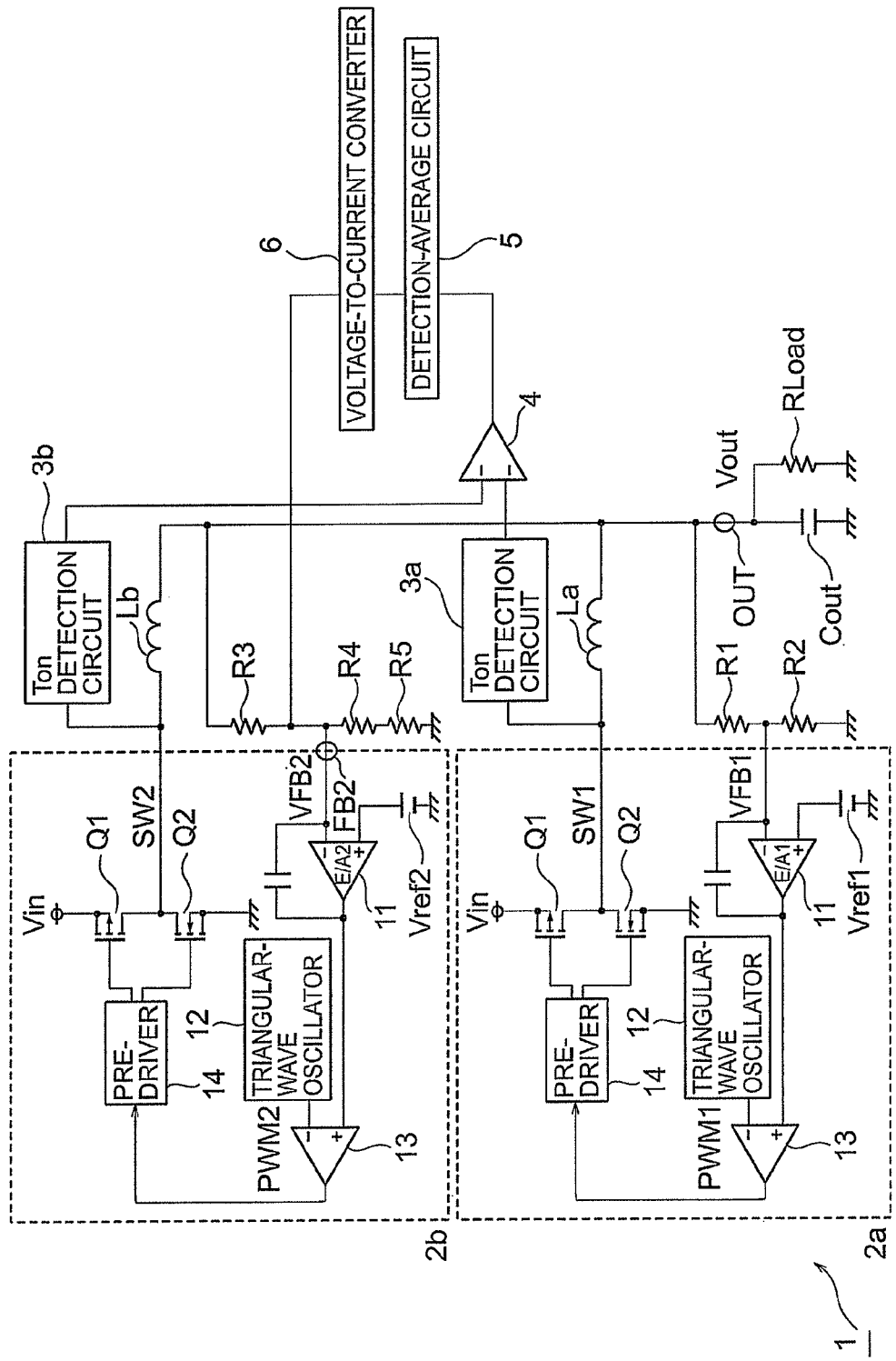
FIG. 1 is a block diagram showing a schematic structure of a DC-DC converter 1 according to a first embodiment.

FIG. 1 is a block diagram showing a schematic structure of a DC-DC converter 1 according to a first embodiment. The DC-DC converter 1 of FIG. 1 has two DC-DC converting units 2a and 2b connected in parallel and controlled so that the duty ratio of each of the DC-DC converting units 2a and 2b becomes approximately equal.

More concretely, the DC-DC converter 1 of FIG. 1 has two DC-DC converting units 2a and 2b, Ton detection circuits 3a and 3b connected to the output terminals of the DC-DC converting units 2a and 2b respectively, a differential amplifier 4 for detecting the output voltage difference between the Ton detection circuits 3a and 3b, a detection-average circuit 5 for detecting and averaging the output voltage of the differential amplifier 4, and a voltage-to-current converter 6 for converting the output voltage of the detection-average circuit 5 into a current signal.

One ends of coils La and Lb are connected to the output terminals of the DC-DC converting units 2a and 2b, and the other ends of the coils La and Lb are both connected to the output terminal OUT of the DC-DC converter 1. Each of the DC-DC converting units 2a and 2b converts direct-current input voltage into square wave voltage. The duty ratio of the square wave voltage changes depending on the voltage level of the direct-current voltage. These square wave voltages are converted into a direct-current output voltage Vout through the coils La and Lb, and outputted from the output terminal OUT.

The output voltage Vout of the output terminal OUT is fed back to feedback terminals FB1 and FB2 of the DC-DC converting units 2a and 2b. More concretely, voltage VRB1 of the feedback terminal FB1 is obtained by dividing the direct-current output voltage Vout by resistor elements R1 and R2 (=Vout·R2/(R1+R2)), and voltage VRB2 of the feedback terminal FB2 is obtained by dividing the direct-current output voltage Vout by resistor elements R3, R4, and R5 (=Vout·(R4+R5)/(R3+R4+R5)).

In the present embodiment, the sum of the resistance values of the resistor elements R4 and R5 is set larger than the resistance value of the resistor element R2. This configuration makes it possible to simplify the structure of the voltage-to-current converter 6, which will be explained in detail later.

The Ton detection circuit 3a/3b detects the duty ratio of the DC-DC converting unit 2a/2b based on the output voltage of its corresponding DC-DC converting unit 2a/2b.

Figure 2:
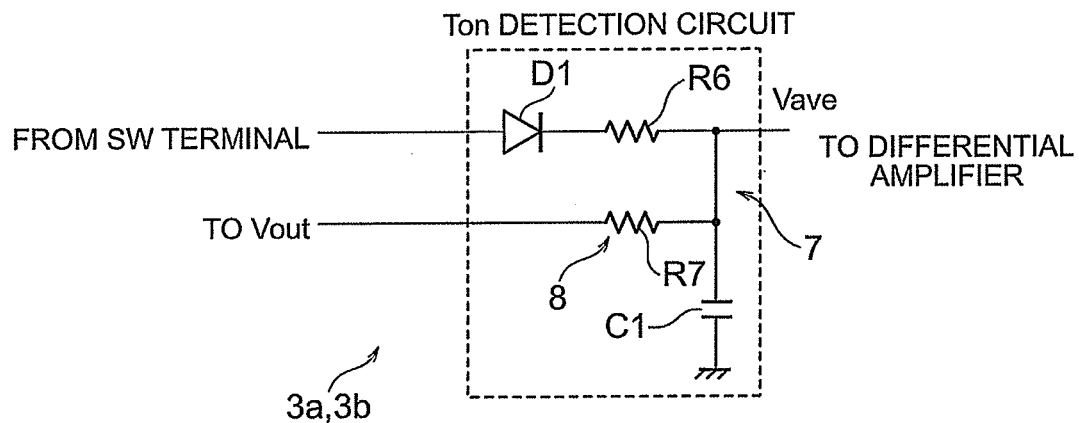
FIG. 2 is a circuit diagram showing an example of an internal structure of each of Ton detection circuits 3a and 3b.

FIG. 2 is a circuit diagram showing an example of the internal structure of each of the Ton detection circuits 3a and 3b. Each of the Ton detection circuits 3a and 3b of FIG. 2 has a diode D1 connected to the output terminal of the DC-DC converting unit 2a or 2b, an integration circuit 7 connected to the cathode terminal of the diode D1, and a discharge circuit 8 connected to the integration circuit 7.

The integration circuit 7 has a resistor element R6 connected between the cathode terminal of the diode D1 and the input terminal of the differential amplifier 4, and a capacitor C1 connected between the input terminal of the differential amplifier 4 and an earth terminal. The discharge circuit 8 has a resistor element R7 connected between the output terminal of the DC-DC converter 1 and the input terminal of the differential amplifier 4.

When the output signal from the DC-DC converting unit 2a/2b exceeds a predetermined threshold voltage, the diode D1 passes the signal therethrough to average the voltage by the integration circuit 7. Further, when the output voltage of the DC-DC converter 1 becomes zero, charges stored in the capacitor C1 are discharged through the discharge circuit 8.

Figure 3:
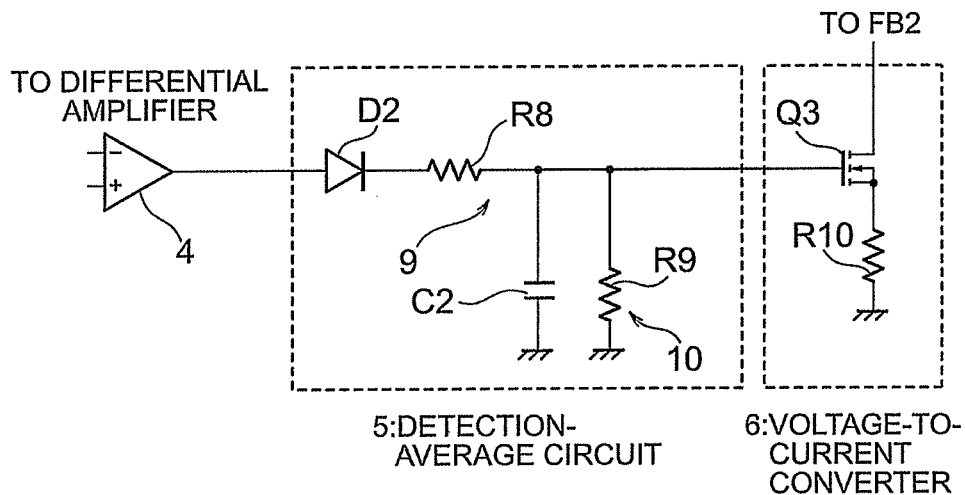
FIG. 3 is a circuit diagram showing an example of an internal structure of a detection-average circuit 5 and a voltage-to-current converter 6.

FIG. 3 is a circuit diagram showing an example of the internal structure of the detection-average circuit 5 and the voltage-to-current converter 6. The detection-average circuit 5 of FIG. 3 has a diode D2 connected to the output terminal of the differential amplifier 4, an integration circuit 9 connected to the cathode terminal of the diode D2, and a discharge circuit 10 connected to the integration circuit 9. The voltage-to-current converter 6 is connected to the discharge circuit 10.

The integration circuit 9 has a resistor element R8 and a capacitor C2 connected in series between the cathode terminal of the diode D2 and an earth terminal. The discharge circuit 10 has a resistor element R9 connected in parallel with the capacitor C2.

The voltage-to-current converter 6 has an NchMOS transistor Q3 and a resistor element R10 connected in series between the feedback terminal FB2 of the DC-DC converting units 2b and an earth terminal.

The diode D2, the integration circuit 9, and the discharging resistor R9 are arranged to detect and average the output voltage of the differential amplifier 4, and the NchMOS transistor Q3 and the resistor element R10 are arranged to convert the detected and averaged voltage into a current signal.

Next, the internal structure of each of the DC-DC converting units 2a and 2b will be explained. Each of the two DC-DC converting units 2a and 2b has the same internal structure, and has an error amplifier 11, a triangular-wave oscillator 12, a pulse width modulator 13, a pre-driver 14, a High-side transistor Q1, and a Low-side transistor Q2.

The error amplifier 11 compares feedback voltage VFB1 or VFB2 with reference voltage Vref1 or Vref2, and outputs an error signal depending on the voltage difference therebetween. The pulse width modulator 13 compares the error signal with the output voltage of the triangular-wave oscillator 12, and outputs a pulse-width modulated signal. The pre-driver 14 controls the switching between the High-side transistor Q1 and the Low-side transistor Q2 based on the pulse-width modulated signal, and adjusts the duty ratio of the square wave voltage serving as an output signal.

Figure 4:
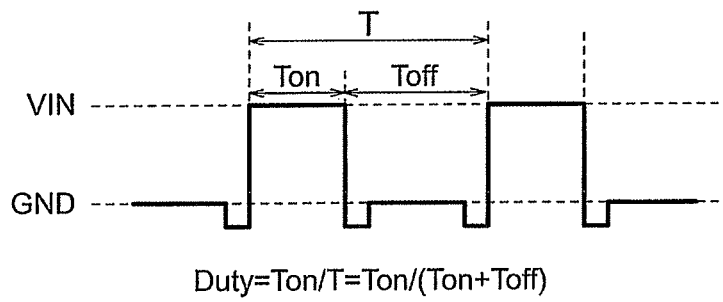
FIG. 4 is a waveform diagram showing a waveform example of a square wave voltage outputted from each of DC-DC converting units 2a and 2b.

FIG. 4 is a waveform diagram showing a waveform example of the square wave voltage outputted from each of the DC-DC converting units 2a and 2b. In FIG. 4, the period in which the square wave voltage outputted from the DC-DC converting unit 2a/2b is at High level is referred to as Ton period, and the period in which the square wave voltage outputted from the DC-DC converting unit 2a/2b is at Low level is referred to as Toff period. The duty ratio can be expressed as Ton/(Ton+Toff=T).

As will be understood from FIG. 4, voltage temporarily falls when transition is made from Ton to Toff. This period is called a dead period, in which both of the High-side transistor Q1 and the Low-side transistor Q2 are turned off. The dead period is arranged to prevent pass-through current caused when both of the High-side transistor Q1 and the Low-side transistor Q2 are turned on in the transition from Ton to Toff, or from Toff to Ton.

Next, the operation of the DC-DC converter 1 of FIG. 1 will be explained. The output signal from the DC-DC converting unit 2a/2b is inputted into its corresponding Ton detection circuit 3a/3b, and the duty ratio of this output signal is detected. More concretely, the Ton detection circuit 3a/3b outputs a voltage signal having a voltage level corresponding to the duty ratio of the output signal from the DC-DC converting unit 2a/2b.

Then, the differential amplifier 4 compares the voltage levels of the output signals of these two Ton detection circuits 3a and 3b, and outputs a signal corresponding to the voltage difference. The output signal from the differential amplifier 4 is averaged in terms of voltage level by the detection-average circuit 5, and then converted into a current signal by the voltage-to-current converter 6. Therefore, the voltage-to-current converter 6 outputs a current signal corresponding to the duty ratio difference between the DC-DC converting units 2a and 2b.

The current signal outputted from the voltage-to-current converter 6 flows through the resistor elements R4 and R5 connected to the feedback terminal FB2 of the DC-DC converting unit 2b. Accordingly, the voltage level of the feedback voltage VFB2 becomes higher as the duty ratio of the DC-DC converting unit 2b becomes larger than the duty ratio of the DC-DC converting unit 2a.

The error amplifier 11 outputs a signal corresponding to the voltage difference between the feedback voltage VFB1/VFB2 and the reference voltage Vref1/Vref2. Therefore, the error amplifier 11 in the DC-DC converting unit 2b outputs a signal whose voltage level becomes lower as the duty ratio of the DC-DC converting unit 2b becomes larger than the duty ratio of the DC-DC converting unit 2a.

The pulse width modulator 13 supplies, to the pre-driver 14, a pulse-width modulated signal whose pulse width becomes larger as the output voltage level of the error amplifier 11 becomes higher. Accordingly, square wave voltage is generated by adjusting the on/off period of the High-side transistor Q1 and the Low-side transistor Q2 corresponding to the duty ratio difference between the DC-DC converting units 2a and 2b.

For example, assume a case where the duty ratio detected by the Ton detection circuit 3b connected to the DC-DC converting unit 2b is larger than the duty ratio detected by the Ton detection circuit 3a connected to the DC-DC converting unit 2a. In this case, the output voltage level of the differential amplifier 4 becomes higher, and the amplitude of the current signal outputted from the voltage-to-current converter 6 also becomes larger. Accordingly, the voltage VFB2 between both ends of the resistor elements R4 and R5 connected to the feedback terminal FB2 becomes larger, and the output voltage level of the error amplifier 11 becomes lower. Control is performed so that the on period of the High-side transistor Q1 becomes shorter, and the duty ratio of the square wave voltage becomes smaller.

In this way, feedback control is performed so that the duty ratios of the two DC-DC converting units 2a and 2b are equal to each other.

In the present embodiment, the sum of the resistance values of the resistor elements R4 and R5 connected to the feedback terminal FB2 of the DC-DC converting unit 2b is set larger than the resistance value of the resistor element R2 connected to the feedback terminal FB1 of the DC-DC converting unit 2a. Accordingly, current from the voltage-to-current converter 6 flows to an earth terminal through the resistor elements R4 and R5, and the voltage difference between both ends of the resistor elements R4 and R5 becomes the feedback voltage VFB2. That is, by setting the sum of the resistance values of the resistor elements R4 and R5 larger than the resistance value of the resistor element R2, offset can be achieved so that current from the voltage-to-current converter 6 flows through the resistor elements R4 and R5. Further, since the voltage-to-current converter 6 continually passes current through the resistor elements R4 and R5 and does not draw external current thereinto, the internal structure of the voltage-to-current converter 6 can be simplified.

Note that the sum of the resistance values of the resistor elements R4 and R5 connected to the feedback terminal FB2 of the DC-DC converting unit 2b may be set smaller than the resistance value of the resistor element R2 connected to the feedback terminal FB1 of the DC-DC converting unit 2a. In this case, current from the output terminal of the DC-DC converting unit 2b flows into the voltage-to-current converter 6, and the amount of inflow current depends on the duty ratio difference between the DC-DC converting units 2a and 2b. That is, since the voltage-to-current converter 6 only draws external current thereinto, the internal structure of the voltage-to-current converter 6 can be simplified.

As stated above, when the sum of the resistance values of the resistor elements R4 and R5 connected to the feedback terminal FB2 of the DC-DC converting unit 2b is set larger than the resistance value of the resistor element R2 connected to the feedback terminal FB1 of the DC-DC converting unit 2a, the voltage-to-current converter 6 passes current to the feedback terminal FB2. On the other hand, when the sum of the resistance values of the resistor elements R4 and R5 connected to the feedback terminal FB2 of the DC-DC converting unit 2b is set smaller than the resistance value of the resistor element R2 connected to the feedback terminal FB1 of the DC-DC converting unit 2a, the voltage-to-current converter 6 draws current thereinto. In both cases, control for equalizing the duty ratios of the DC-DC converting units 2a and 2b is performed.

As stated above, in the first embodiment, the Ton detection circuits 3a and 3b detect the duty ratios of the output signals from the output terminals of the DC-DC converting units 2a and 2b connected thereto, and feedback control is performed using a current signal corresponding to the duty ratio difference therebetween to adjust the on/off period of the High-side transistor Q1 and the Low-side transistor Q2. Accordingly, the duty ratios of the DC-DC converting units 2a and 2b can be made equal, and the drive of a large capacity load can be evenly shared between the DC-DC converting units 2a and 2b, which makes it possible to stabilize the power-supply voltage level even when a large capacity load is driven.

Second Embodiment

The above Ton detection circuit 3a/3b is arranged to detect the duty ratio of the output terminal of the DC-DC converting unit 2a/2b, and passes the output signal through the diode D1 as shown in FIG. 2 only during the Ton period to average the voltage of the passed signal. As a modification example to the contrary, the output signal may be passed only during the Toff period. In this case, Toff detection circuits 21a and 21b are arranged instead of the Ton detection circuits 3a and 3b.

Figure 5:
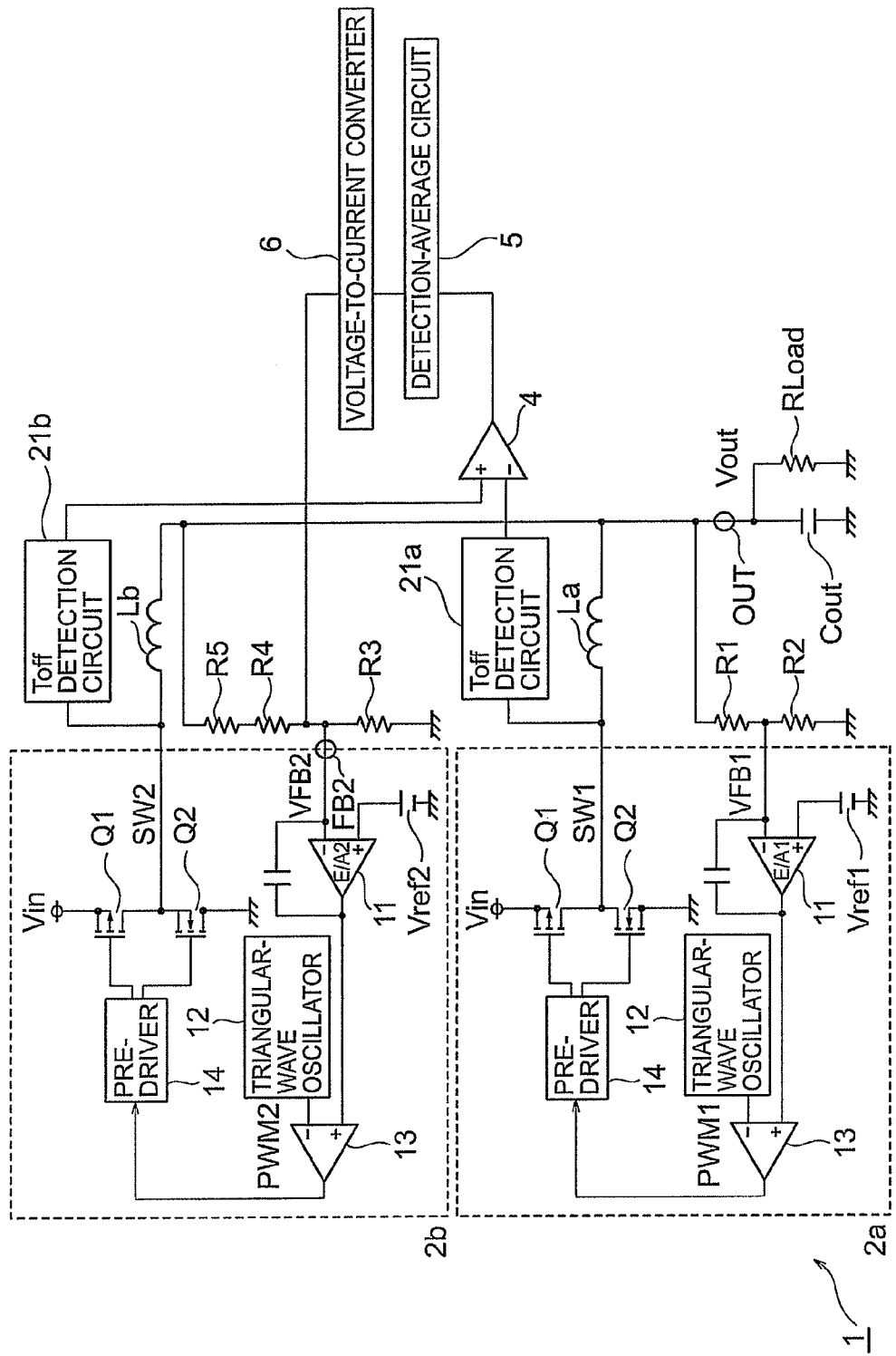
FIG. 5 is a block diagram showing a schematic structure of the DC-DC converter 1 according to a second embodiment.

FIG. 5 is a block diagram showing a schematic structure of the DC-DC converter 1 according to a second embodiment. In FIG. 5, the same components as those in FIG. 1 are given the same symbols, and differences therebetween will be mainly explained.

The DC-DC converter 1 of FIG. 5 has the Toff detection circuits 21a and 21b connected to the output terminals of the DC-DC converting units 2a and 2b. The Toff detection circuit 21a/21b detects the average voltage of the output signal from the DC-DC converting unit 2a/2b within the period in which the output signal is at a predetermined voltage level or lower. As a result, the Toff detection circuits 21a and 21b detect the duty ratios similarly to the Ton detection circuits 3a and 3b of FIG. 2.

Figure 6:
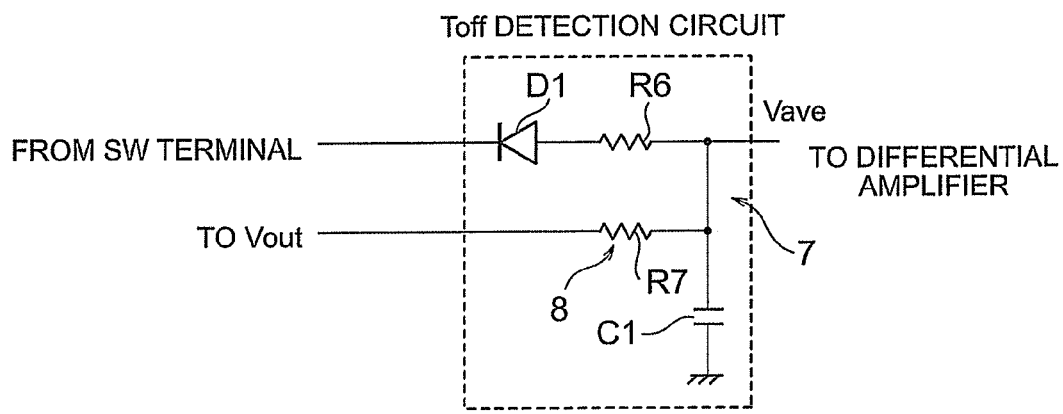
FIG. 6 is a circuit diagram showing an example of an internal structure of each of Toff detection circuits 21a and 21b.

FIG. 6 is a circuit diagram showing an example of the internal structure of each of the Toff detection circuits 21a and 21b. The Toff detection circuit 21a/21b of FIG. 6 is different from the Ton detection circuit 3a/3b of FIG. 2 in the connection direction of the diode D1, and the other configurations are the same.

In the Toff detection circuit 21a/21b of FIG. 6, since the cathode terminal of the diode is connected to the output terminal of the DC-DC converting unit 2a/2b, the diode passes the output signal from the DC-DC converting unit 2a/2b therethrough within the period in which the signal is at a predetermined voltage level or lower in order to average the voltage of the passed signal.

Figure 7:
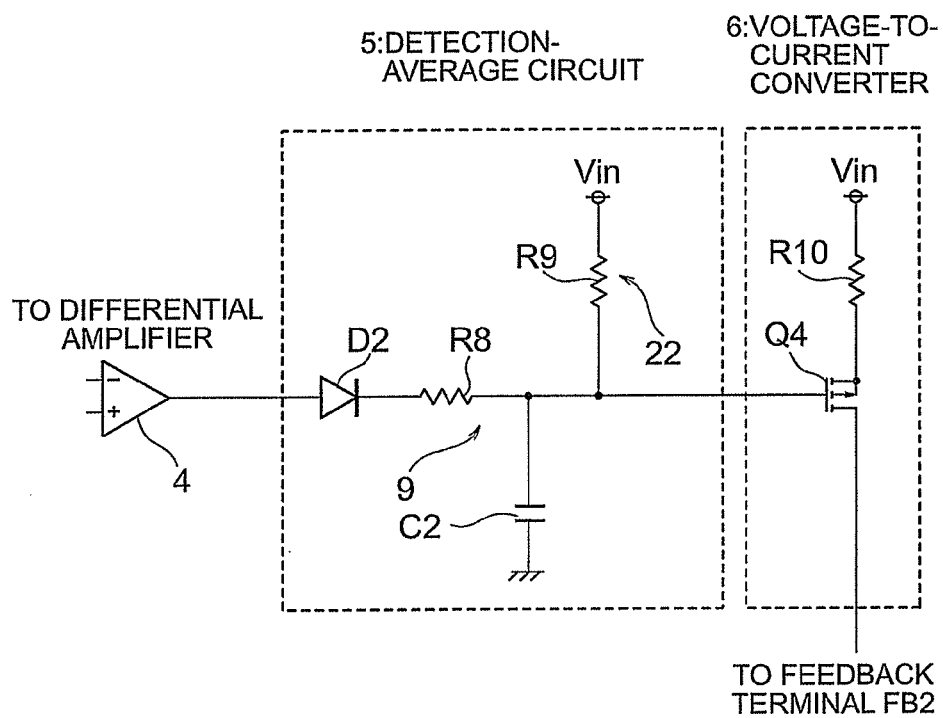
FIG. 7 is a circuit diagram showing an internal structure of the detection-average circuit 5 and the voltage-to-current converter 6 connected to the output terminal of a differential amplifier 4 in the DC-DC converter 1 of FIG. 5.

FIG. 7 is a circuit diagram showing the internal structure of the detection-average circuit 5 and the voltage-to-current converter 6 connected to the output terminal of the differential amplifier 4 in the DC-DC converter 1 of FIG. 5. The detection-average circuit 5 of FIG. 7 has the diode D2, the integration circuit 9, and a charge circuit 22. The detection-average circuit 5 of FIG. 7 is different from the detection-average circuit 5 of FIG. 3 in that the diode D2 is connected in a different direction and that the charge circuit 22 is connected instead of the discharge circuit 10. The charge circuit 22 has the resistor element R9 connected between a power-supply terminal and the output terminal of the integration circuit 9.

Further, the voltage-to-current converter 6 of FIG. 7 has the resistor element R10 and a PchMOS transistor Q4 connected in series between a power-supply terminal and the feedback terminal FB2. The voltage-to-current converter 6 of FIG. 7 is different from the voltage-to-current converter 6 of FIG. 3 in that the resistor element R10 is connected not to the earth terminal but to the power-supply terminal, and that the conductivity type of the transistor Q4 is P-type.

As stated above, in the second embodiment, since the Toff detection circuits 21a and 21b are connected to the output terminals of the DC-DC converting units 2a and 2b to detect the duty ratios, control for equalizing the duty ratios of the DC-DC converting units 2a and 2b can be performed similarly to the case where the Ton detection circuits 3a and 3b are arranged.

Third Embodiment

In a third embodiment, the differential amplifier 4, the detection-average circuit 5, and the voltage-to-current converter 6 are integrated.

Figure 8:
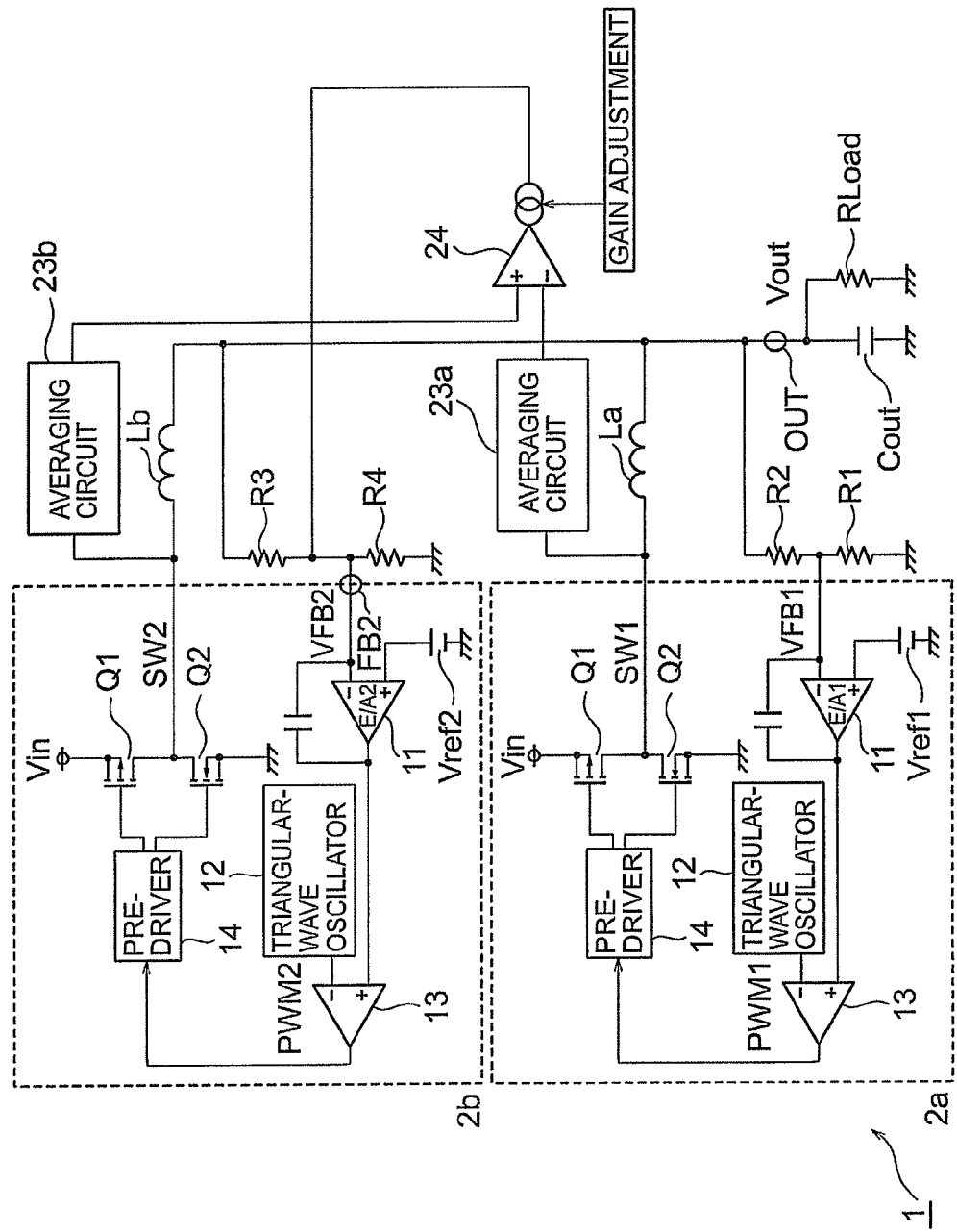
FIG. 8 is a block diagram showing an internal structure of the DC-DC converter 1 according to a third embodiment.

FIG. 8 is a block diagram showing the internal structure of the DC-DC converter 1 according to the third embodiment. In FIG. 8, the same components as those in FIGS. 1 and 5 are given the same symbols, and differences therebetween will be mainly explained.

The DC-DC converter 1 of FIG. 8 is different from the DC-DC converter 1 of FIG. 1 in having averaging circuits 23a and 23b instead of the Ton detection circuits 3a and 3b, and has a current output amplifier 24 obtained by integrating the differential amplifier 4, the detection-average circuit 5, and the voltage-to-current converter 6.

Figure 9:
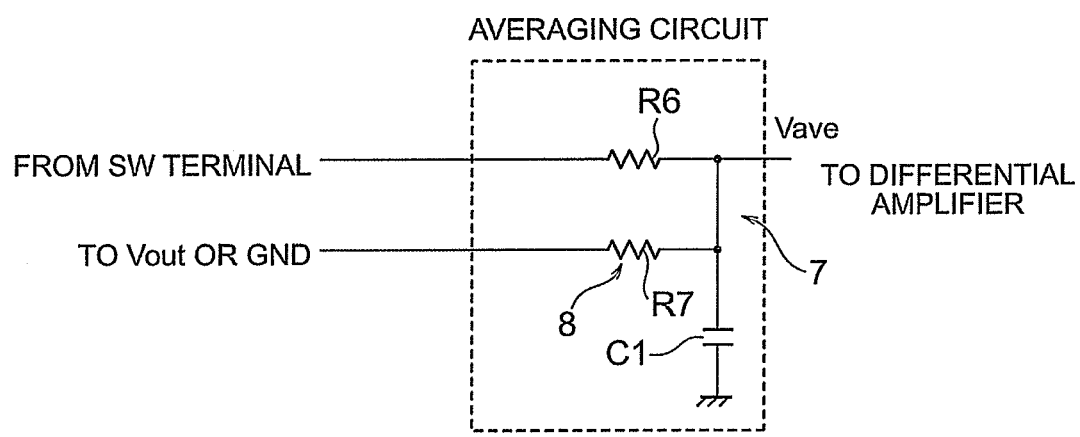
FIG. 9 is a block diagram showing an example of an internal structure of each of averaging circuits 23a and 23b of FIG. 8.

FIG. 9 is a block diagram showing an example of the internal structure of each of the averaging circuits 23a and 23b of FIG. 8. The averaging circuit 23a/23b of FIG. 9 is obtained by removing the diode D1 from the Ton detection circuit 3a/3b of FIG. 2. The averaging circuit 23a/23b of FIG. 9 averages the output signal from its corresponding DC-DC converting unit 2a/2b, without depending on its voltage level.

The current output amplifier 24 of FIG. 8 generates a current signal corresponding to the output voltage difference between the averaging circuits 23a and 23b. Accordingly, the output current waveform of the current output amplifier 24 becomes similar to the output current waveform of the voltage-to-current converter 6 of FIG. 1.

As stated above, in the third embodiment, the circuit scale of the DC-DC converter 1 can be more simplified than the DC-DC converter 1 in the first and second embodiments, by arranging the averaging circuits 23a and 23b having more simplified circuit configuration than the Ton detection circuits 3a and 3b or the Toff detection circuits 21a and 21b, and by arranging the current output amplifier 24 obtained by integrating the differential amplifier 4, the detection-average circuit 5, and the voltage-to-current converter.

Fourth Embodiment

In the examples explained in the first to third embodiments, the DC-DC converter 1 has the two DC-DC converting units 2a and 2b connected in parallel. However, the DC-DC converter 1 may have three or more DC-DC converting units connected in parallel.

Figure 10:
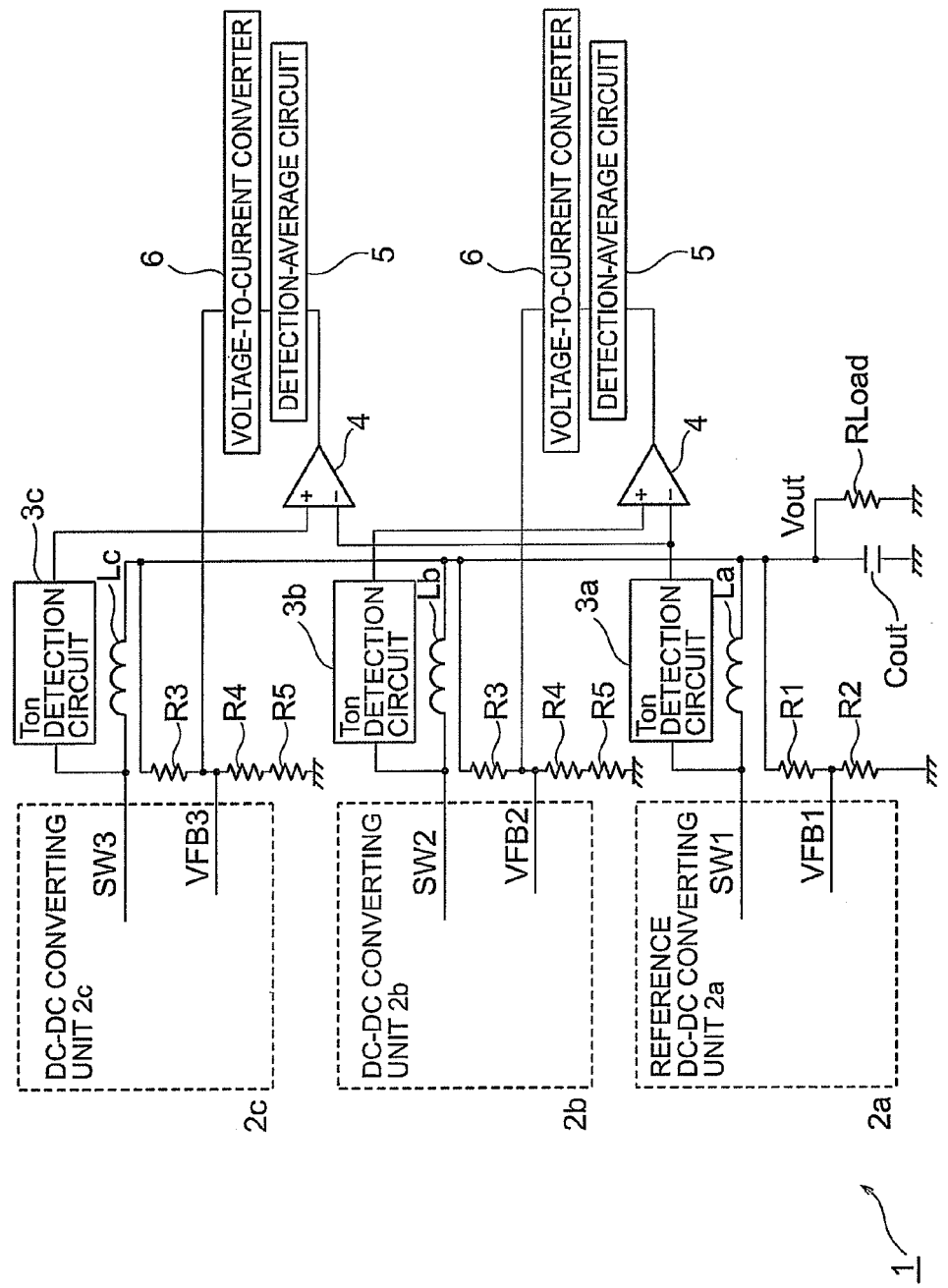
FIG. 10 is a block diagram showing a schematic structure of a DC-DC converter 1 according to a fourth embodiment.

FIG. 10 is a block diagram showing a schematic structure of the DC-DC converter 1 according to a fourth embodiment. The DC-DC converter 1 of FIG. 10 is different from the DC-DC converter 1 of FIG. 1 in having three DC-DC converting units 2a, 2b, and 2c and having two differential amplifiers 4, two detection-average circuits 5, and two voltage-to-current converters 6. Further, two resistor elements R4 and R5 are connected in series between the feedback terminal of the DC-DC converting unit 2b/2c connected to the output terminal of the voltage-to-current converter 6 and the earth terminal.

The differential amplifier 4 uses the output voltage of the Ton detection circuit 3a connected to the DC-DC converting unit 2a as a reference voltage, and detects the voltage difference between the reference voltage and the output voltage of the Ton detection circuit 3b/3c connected to the DC-DC converting unit 2b/2c. The voltage-to-current converter 6 supplies a current signal corresponding to the voltage difference detected by the differential amplifier 4 to the resistor elements R4 and R5 connected to the feedback terminal in the corresponding DC-DC converting unit 2b/2c.

The sum of the resistance values of the two resistor elements R4 and R5 connected in series between the feedback terminal FB2 and the earth terminal is set larger than the resistance value of the resistor element R2 connected between the feedback terminal FB1 to which current from the voltage-to-current converter 6 signal is not fed back and an earth terminal. Accordingly, as explained in the first embodiment, current from the voltage-to-current converter 6 signal is continually drawn into the resistor elements connected in series, and the structure of the voltage-to-current converter 6 can be simplified.

As explained in the first embodiment, the sum of the resistance values of the two resistor elements R4 and R5 connected in series between the feedback terminal FB2 and the earth terminal may be set smaller than the resistance value of the resistor element R2 connected between the feedback terminal FB1 to which current from the voltage-to-current converter 6 signal is not fed back and an earth terminal. In this case, current passing through the coil Lb and the resistor element R3 is continually drawn into the voltage-to-current converter 6, and the structure of the voltage-to-current converter 6 can be simplified in the end.

Figure 11:
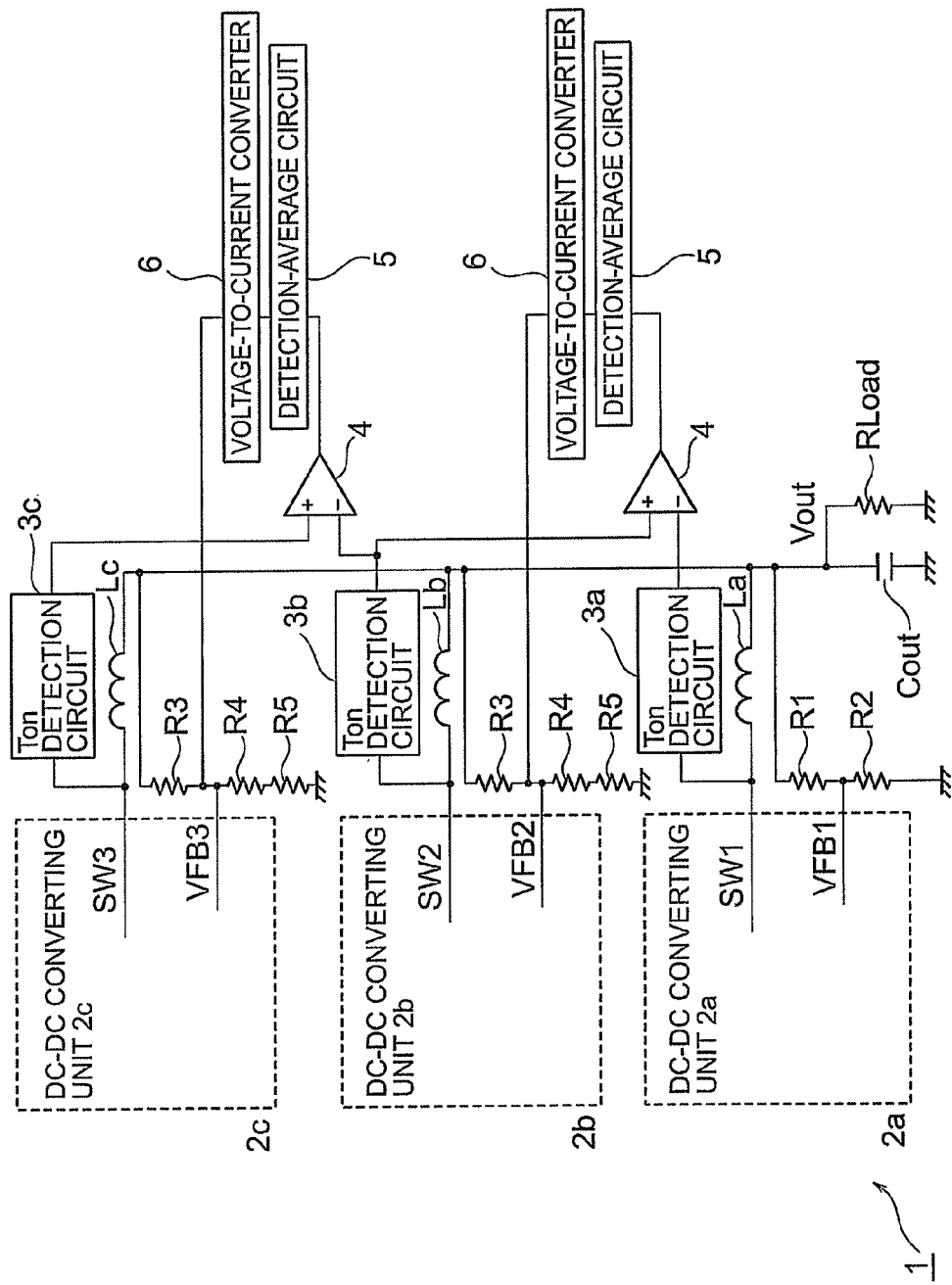
FIG. 11 is a block diagram showing a schematic structure of a DC-DC converter 1 according to a first modification example derived from FIG. 10.

FIG. 11 is a block diagram showing a schematic structure of the DC-DC converter 1 according to a first modification example derived from FIG. 10. The DC-DC converter 1 of FIG. 11 is different from FIG. 10 in the pair to be compared by the differential amplifier 4. The differential amplifier 4 of FIG. 11 compares the output voltages of two Ton detection circuits (3a and 3b) or (3b and 3c) connected to adjacent DC-DC converting units, and detects the voltage difference therebetween.

Figure 12:
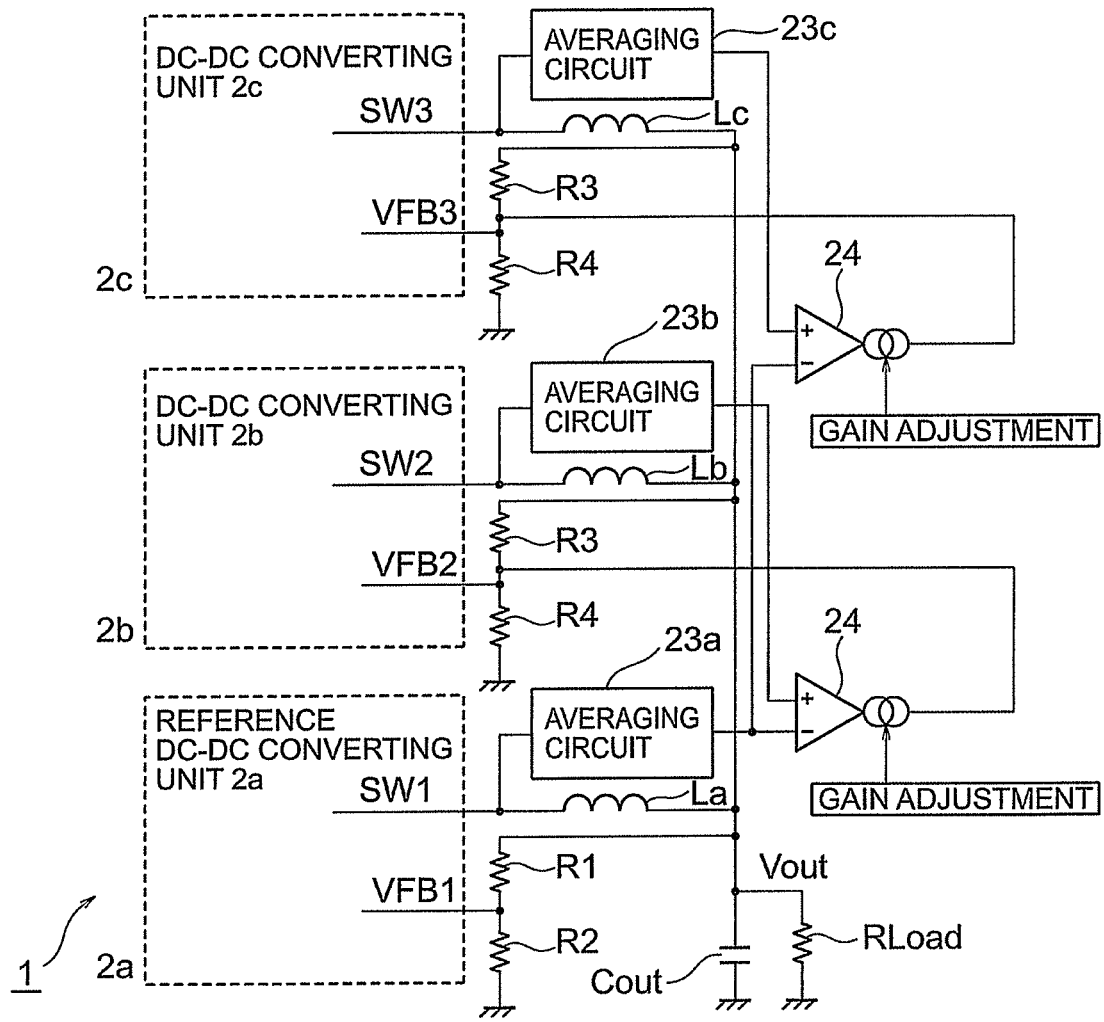
FIG. 12 is a block diagram showing a schematic structure of a DC-DC converter 1 according to a second modification example derived from FIG. 10.

FIG. 12 is a block diagram showing a schematic structure of the DC-DC converter 1 according to a second modification example derived from FIG. 10. The DC-DC converter 1 of FIG. 12 is different from the DC-DC converter 1 of FIG. 10 in having the averaging circuits 23a, 23b, and 23c of FIG. 9 instead of the Ton detection circuits 3a, 3b, and 3c, and having the current output amplifier 24 obtained by integrating the differential amplifier 4, the detection-average circuit 5, and the voltage-to-current converter 6.

Figure 13:
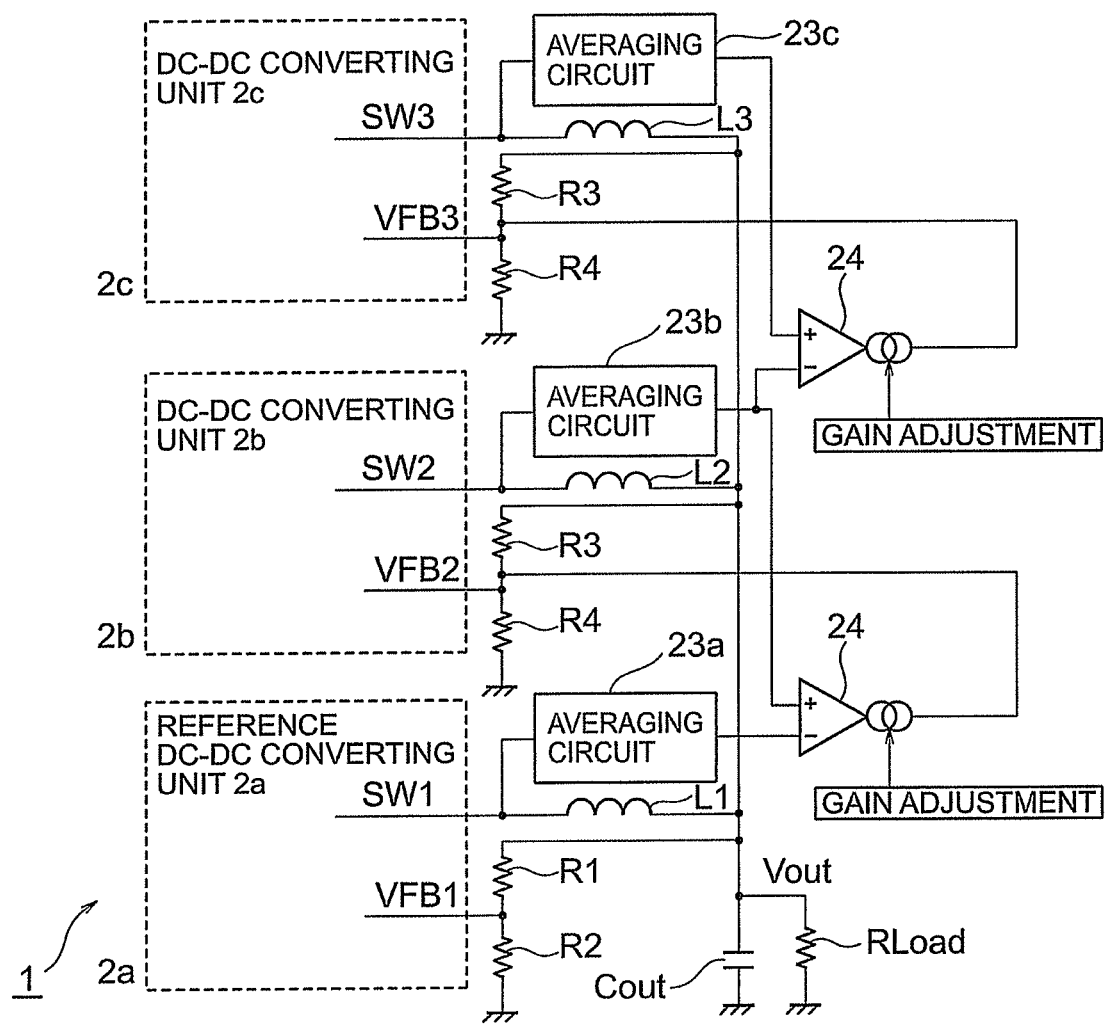
FIG. 13 is a block diagram showing a schematic structure of a DC-DC converter 1 according to a third modification example derived from FIG. 10.

FIG. 13 is a block diagram showing a schematic structure of the DC-DC converter 1 according to a third modification example derived from FIG. 10. The DC-DC converter 1 of FIG. 13 is different from the DC-DC converter 1 of FIG. 11 in having the averaging circuits 23a, 23b, and 23c of FIG. 9 instead of the Ton detection circuits 3a, 3b, and 3c, and having the current output amplifier 24 obtained by integrating the differential amplifier 4, the detection-average circuit 5, and the voltage-to-current converter 6.

As stated above, in the fourth embodiment, when three DC-DC converting units 2a, 2b, and 2c are arranged, by performing control for feeding back the result of comparison between the duty ratios of each two DC-DC converting units, the duty ratios of all of the DC-DC converting units 2a, 2b, and 2c can be made equal.

When the number of DC-DC converting units is n (n is an integer of 2 or greater), the feedback control should be performed by dividing the DC-DC converting units into (n−1) groups each composed of two DC-DC converting units, and detecting the duty ratio difference in each group by the differential amplifier 4.

Fifth Embodiment

In FIG. 1 etc., the detection-average circuit 5 is connected to the output terminal of the differential amplifier 4, and is followed by and connected to the voltage-to-current converter 6. However, the detection-average circuit 5 may be omitted.

Figure 14:
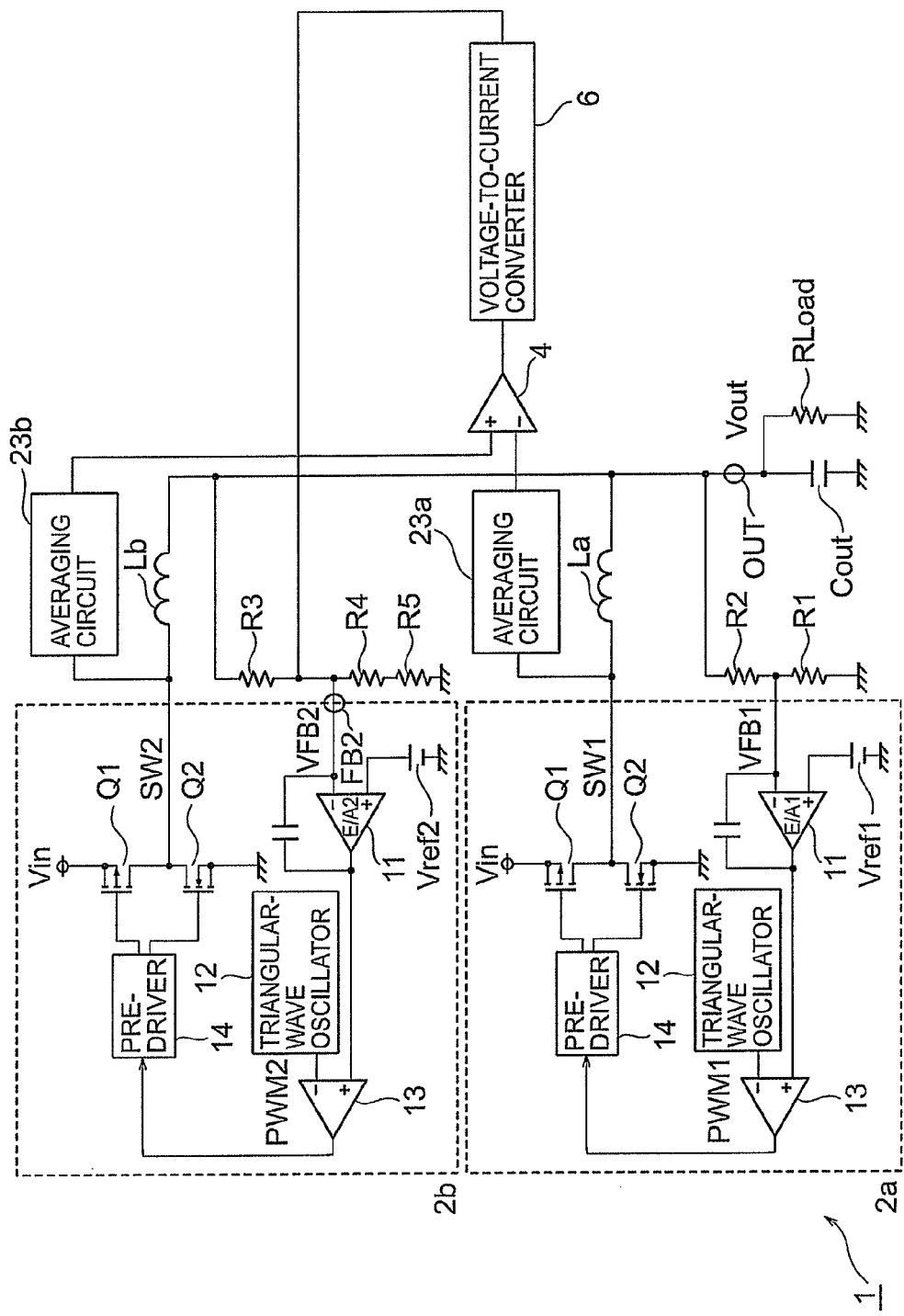
FIG. 14 is a block diagram showing a schematic structure of a DC-DC converter 1 according to a fifth embodiment.

FIG. 14 is a block diagram showing a schematic structure of the DC-DC converter 1 according to a fifth embodiment. FIG. 14 is different from FIG. 1 in that the voltage-to-current converter 6 is directly connected to the output terminal of the differential amplifier 4. In FIG. 14, the averaging circuits 23a and 23b each having the internal structure as shown in FIG. 9 are arranged instead of the Ton detection circuits 3a and 3b of FIG. 1, but this is not an essential difference. The Ton detection circuits 3a and 3b or the Toff detection circuits 21a and 21b may be arranged instead of the averaging circuits 23a and 23b.

Figure 15:
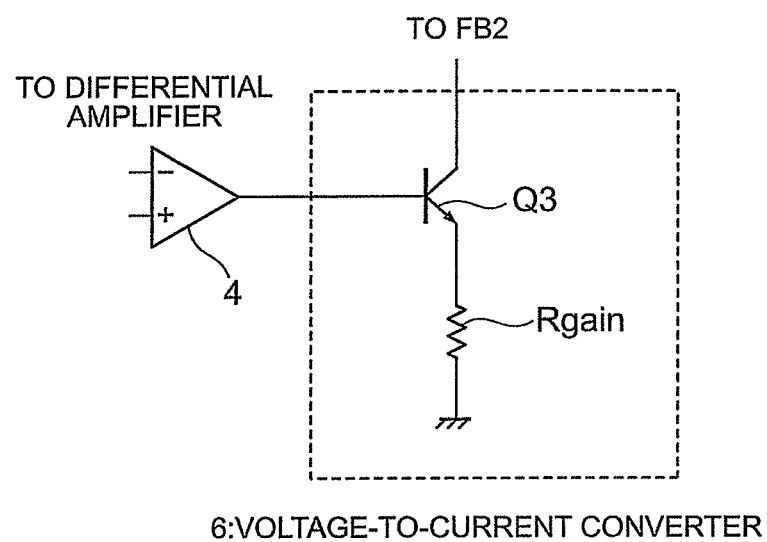
FIG. 15 is a circuit diagram showing an example of an internal structure of the voltage-to-current converter 6 of FIG. 14.

FIG. 15 is a circuit diagram showing an example of the internal structure of the voltage-to-current converter 6 of FIG. 14. The voltage-to-current converter 6 of FIG. 15 has the NPN or NchMOS transistor Q3 and the resistor element R10 connected in series between the feedback terminal FB2 and the earth terminal.

The structure of the DC-DC converter 1 of FIG. 14 is more simplified compared to FIG. 1, since the detection-average circuit 5 is omitted. Accordingly, circuit area and component cost can be reduced.

Figure 16:
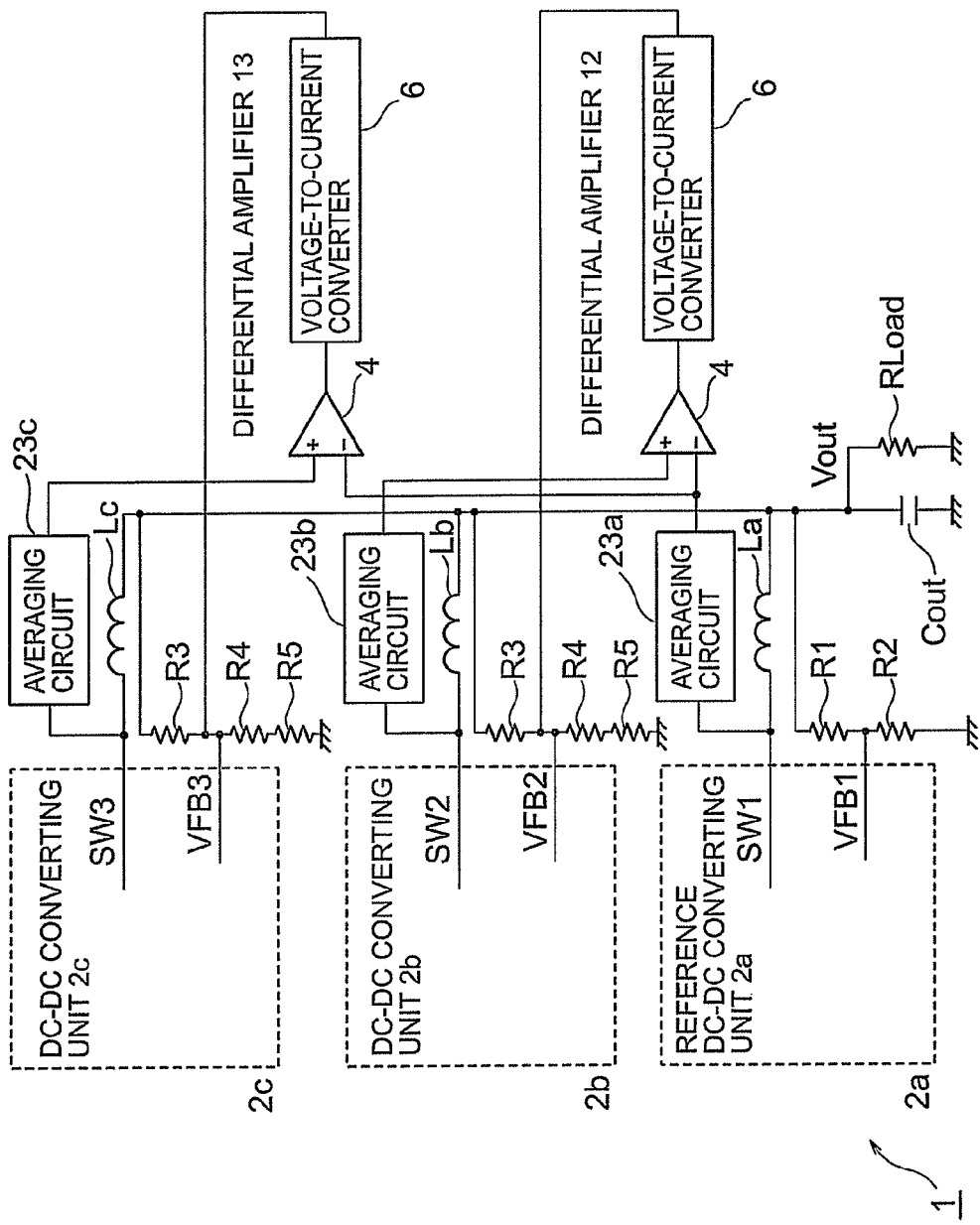
FIG. 16 is a block diagram showing an example of arranging three DC-DC converting units 2a, 2b, and 2c, as a modification example derived from FIG. 15.

FIG. 16 is a block diagram showing an example of arranging three DC-DC converting units 2a, 2b, and 2c, as a modification example derived from FIG. 15. The DC-DC converter 1 of FIG. 16 is formed similarly to the DC-DC converter 1 of FIG. 12 excepting that the voltage-to-current converter 6 is directly connected to the output terminal of the differential amplifier 4.

Figure 17:
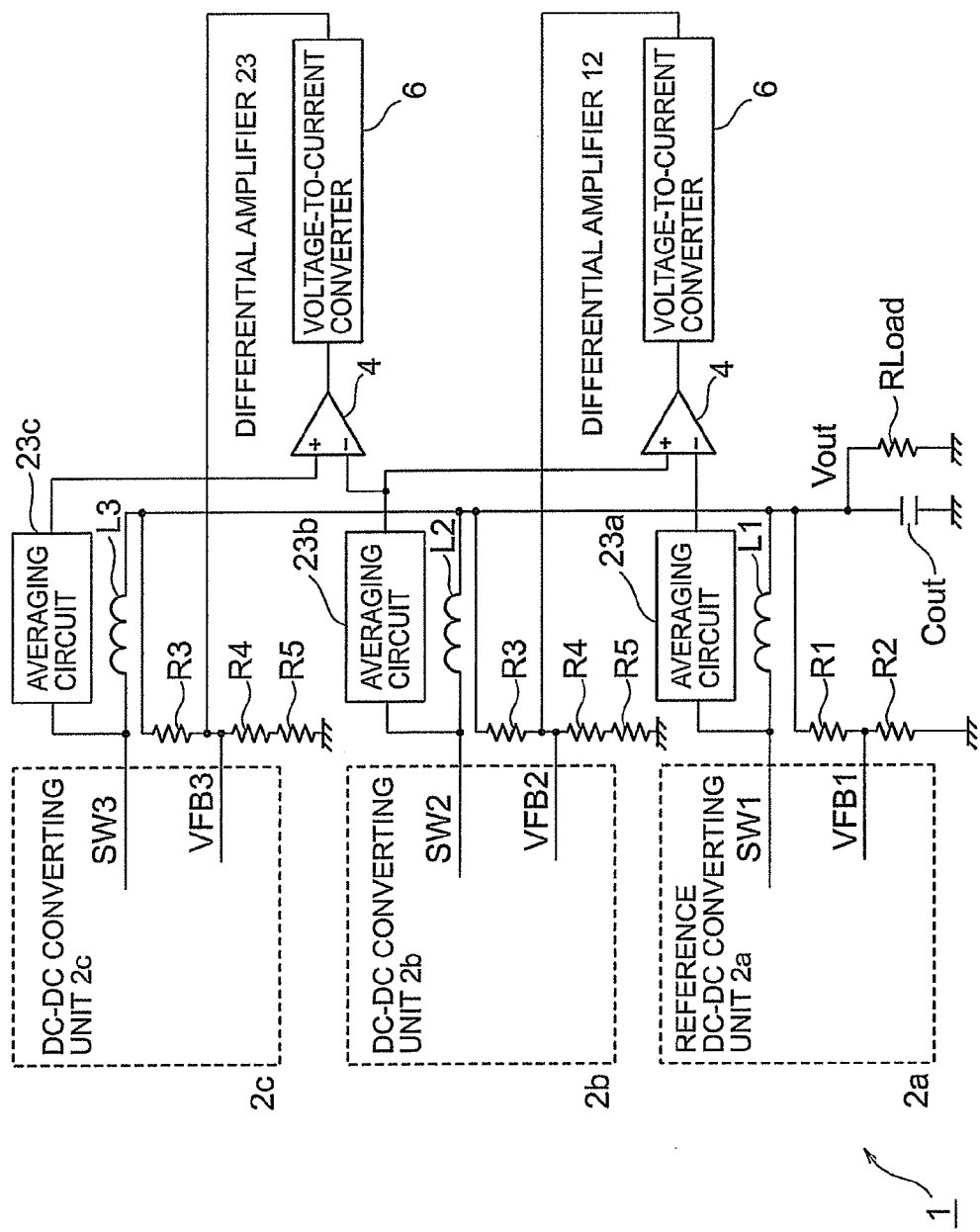
FIG. 17 is a block diagram showing a modification example derived from FIG. 13.

FIG. 17 shows a modification example derived from FIG. 13, and the DC-DC converter 1 of FIG. 17 is formed similarly to the DC-DC converter 1 of FIG. 13 excepting that the voltage-to-current converter 6 is directly connected to the output terminal of the differential amplifier 4.

As stated above, even when the voltage-to-current converter 6 is directly connected to the output terminal of the differential amplifier 4, a current signal for equalizing the duty ratio of each DC-DC converting unit can be generated. Further, omitting the detection-average circuit 5 is more effective in the reduction of circuit area when a greater number of DC-DC converting units are arranged in the DC-DC converter 1.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A DC-DC converter comprising:
    a plurality of DC-DC converting units outputting a square wave voltage;
    a plurality of inductor elements, each inductor element being connected to each of the DC-DC converting units, and comprising one end connected to an output terminal of its corresponding DC-DC converting unit and another end connected to a common external output terminal;
    a plurality of duty detection circuits, each duty detection circuit being connected to the output terminals of each of the DC-DC converting units, and to detect a duty ratio of the square wave voltage outputted from its corresponding DC-DC converting unit; and
    a duty adjustment circuit comparing output signals from the duty detection circuits, and to adjust the duty ratio of the DC-DC converting unit connected to one of the duty detection circuits based on a result of comparing the output signals so that the duty ratio of the square wave voltage of each of the DC-DC converting units becomes equal,
    wherein each of the duty detection circuits detects the duty ratio based on an average voltage level of the square wave voltage within a period in which the square wave voltage is at a predetermined voltage level or greater, or based on an average voltage level of the square wave voltage within a period in which the square wave voltage is less than at a predetermined voltage level.

2. The DC-DC converter of claim 1,
    wherein each of the duty detection circuits comprises:
    a rectifier element comprising an cathode terminal and an anode terminal connected to the output terminal of its corresponding DC-DC converting unit;
    an integration circuit being connected to the cathode terminal; and
    a discharge circuit being connected to the integration circuit.

3. The DC-DC converter of claim 1,
    wherein the duty adjustment circuit comprises a voltage-to-current converter converting a voltage difference between average voltages detected by the duty detection circuits into a current signal, and
    each of the DC-DC converting unit comprises:
        voltage dividing resistors generating a divided voltage of the square wave voltage; and
        a duty control circuit controlling the duty ratio of the square wave voltage depending on a voltage difference between the divided voltage and a reference voltage,
        the voltage dividing resistors in the DC-DC converting unit connected to the voltage-to-current converter generating the divided voltage depending on the current signal.

4. The DC-DC converter of claim 3,
    wherein a resistance value of the voltage dividing resistor in the DC-DC converting unit connected to one duty detection circuit is different from a resistance value of the voltage dividing resistor in the DC-DC converting unit connected to another duty detection circuit.

5. The DC-DC converter of claim 3,
wherein the duty adjustment circuit is a differential amplifier comprising the voltage-to-current converter and capable of outputting current.

6. The DC-DC converter of claim 5,
wherein each of the duty detection circuits comprises:
an integration circuit being connected to the output terminal of its corresponding DC-DC converting unit; and
a discharge circuit being connected to the integration circuit.

7. The DC-DC converter of claim 3,
wherein the duty adjustment circuit comprises:
a differential amplifier detecting a differential voltage between the output voltages of the duty detection circuits; and
a detection-average circuit detecting and averaging an output voltage of the differential amplifier,
the voltage-to-current converter converting an output voltage of the detection-average circuit into the current signal.

8. The DC-DC converter of claim 3,
wherein the duty control circuit comprises:
an error amplifier generating a signal corresponding to a voltage difference between the divided voltage and the reference voltage;
a pulse width modulator being converted an output signal from the error amplifier into a pulse-width modulated signal; and
a square wave voltage generating circuit adjusting the duty ratio of the square wave voltage based on the pulse-width modulated signal.

9. The DC-DC converter of claim 3,
wherein the voltage-to-current converter performs only any one of: current output operation for passing current through the voltage dividing resistors; and current input operation for drawing current into the voltage-to-current converter.

10. A DC-DC conversion method, comprising:
detecting a duty ratio of a square wave voltage outputted from each of a plurality of DC-DC converting units;
comparing two signals obtained by detecting the duty ratio of the square wave voltage, and adjusting the duty ratio of one of the DC-DC converting units so that the duty ratio of the square wave voltage becomes equal; and
outputting a direct voltage corresponding to the square wave voltage,
wherein the detecting of the duty ratio detects the duty ratio based on an average voltage level of the square wave voltage within a period in which the square wave voltage is at a predetermined voltage level or greater, or based on an average voltage level of the square wave voltage within a period in which the square wave voltage is less than at a predetermined voltage level.

11. The method of claim 10,
wherein the detecting of the duty ratio rectifies the output signal of the corresponding DC-DC converting unit, and then integrates the rectified signal, and then performs discharge in order to detect the duty ratio.

12. The method of claim 10,
wherein the adjusting of the duty ratio converts a voltage difference between the average voltages into a current signal; and
each of the DC-DC converting unit generates a divided voltage of the square wave voltage by using voltage dividing resistors, and controls the duty ratio of the square wave voltage depending on a voltage difference between the divided voltage and a reference voltage.

13. The DC-DC conversion method of claim 12,
wherein a resistance value of the voltage dividing resistor in the DC-DC converting unit connected to one duty detection circuit is different from a resistance value of the voltage dividing resistor in the DC-DC converting unit connected to another duty detection circuit.

14. The DC-DC conversion method of claim 12,
wherein the adjusting of the duty ratio performs conversion into the current signal using a differential amplifier comprising the voltage-to-current converter and capable of outputting current.

15. The DC-DC conversion method of claim 14,
wherein the detecting of the duty ratio averages the output voltage of the DC-DC converting unit by an integration circuit connected to the output voltage of the DC-DC converting unit, and outputs current by a discharge circuit configured to be connected to the integration circuit.

16. The DC-DC conversion method of claim 12,
wherein the adjusting of the duty ratio detects a differential voltage between the output voltages of the duty detection circuits, and detects and averages the differential voltage, and converts the detected and averaged differential voltage into the current signal.

17. The DC-DC conversion method of claim 12,
wherein the controlling of the duty ratio generates a signal corresponding to a voltage difference between the divided voltage and the reference voltage, converts the signal corresponding to the voltage difference into a pulse-width modulated signal, and adjusts the duty ratio of the square wave voltage based on the pulse-width modulated signal.

18. The DC-DC conversion method of claim 12,
wherein the voltage-to-current converter performs only any one of: current output operation for passing current through the voltage dividing resistors; and current input operation for drawing current into the voltage-to-current converter.

* * * * *